G. SCARAMUZZA.
FLY WHEEL.
APPLICATION FILED MAR. 20, 1908.
928,544.
Patented July 20, 1909.
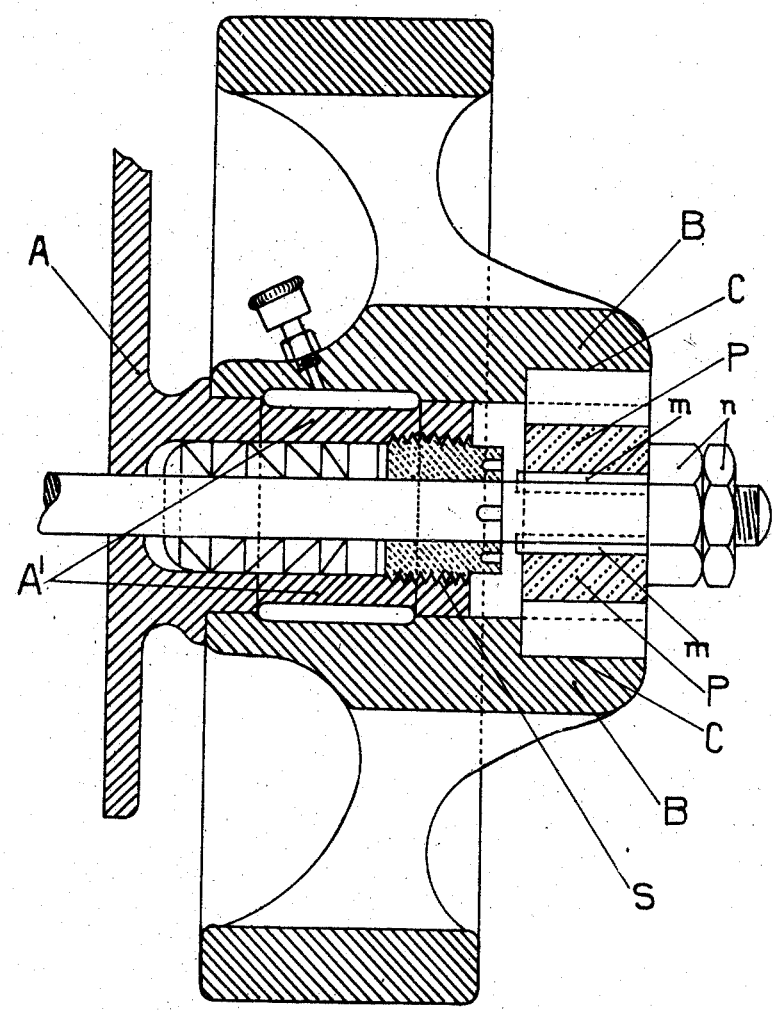

UNITED STATES PATENT OFFICE.

GINO SCARAMUZZA, OF TURIN, ITALY, ASSIGNOR TO SOCIETÀ ANONIMA PER FRIGORIGENI E MOTORI "MOTOFRIGOR," OF TURIN, ITALY.

FLY-WHEEL.

No. 928,544.      Specification of Letters Patent.      Patented July 20, 1909.

Application filed March 20, 1908. Serial No. 422,331.

*To all whom it may concern:*

Be it known that I, GINO SCARAMUZZA, residing at Via Mazzini 2, Turin, Italy, have invented certain new and useful Improvements in Fly-Wheels, of which the following is a full, clear, and exact specification.

The present invention relates to gas compressors with an hermetically closed casing and the object of the invention is, first and foremost, to relieve the shaft of the weight of the flywheel in order, in this way, to avoid the possible oscillations and bending strains which arise from the flywheel itself.

At the same time the object of the invention is also to provide an arrangement which enables the outer bearing of the shaft to be omitted, for the purpose of considerably diminishing the size of the apparatus in the direction of the length of the shaft, without thereby reducing the length of the stuffing box which must allow the casing shaft to pass through outward and must possess sufficient length to insure absolute tightness.

The realization of the object of the invention is attained by the following construction:

A is the wall of the closed casing of the compressor, which carries the outer cylinder $A^1$ of the stuffing box. This outer body is so turned and prepared that it can serve as the axle for the hub of the flywheel. The masses of the rim and the hub are so arranged that a relief of the entire weight takes place onto the stuffing box and through this onto the casing itself. In order to transmit the movement to the shaft, the hub is prolonged up to B B and provided with grooves C C into which a cross or star shaped piece of steel P is fitted. This piece is secured upon the shaft of the compressor by the aid of the wedges $m$, $m$, and its movement in a transverse direction is prevented by a nut and lock nut, $n$, $n$. Rotary motion is therefore transmitted by the piece P continuously and without shocks and vibrations from the flywheel and belt pulley to the shaft of the compressor.

To tighten up the stuffing box or to alter the interior of the stuffing box the nut and lock nut $n$, $n$, are slackened and the piece P can be taken out with great ease as stated above it is fitted with slight friction onto the shaft and into the flywheel. As soon as the piece P has been taken out, the cover of the stuffing box is accessible straightway and the piece S can be set in motion by means of a specially shaped key.

What I claim is:

1. A gas compressor having a shaft passing therethrough and a stuffing box surrounding the shaft, a fly wheel mounted on the stuffing box, and means for connecting the fly wheel to the shaft.

2. A gas compressor having a shaft passing therethrough and a stuffing box surrounding the shaft, a fly wheel mounted to rotate on the stuffing box, and a coupling member for detachably connecting said shaft with the fly wheel.

3. A gas compressor having a shaft passing therethrough and a coupling box surrounding the shaft, said stuffing box having a packing chamber for the shaft, a fly wheel mounted on the stuffing box and a removable coupling member connecting the shaft to the fly wheel so as to allow access to the packing chamber of the stuffing box.

In witness whereof, I have hereunto signed my name in the presence of two subscribing witnesses.

GINO SCARAMUZZA.

Witnesses:
    JOHN BAZETTO,
    LOUIS ALLAN.